Sept. 15, 1936. T. A. MITCHELL 2,054,226
METHOD OF TREATING LEAD SULPHIDE ORES
Filed May 16, 1934
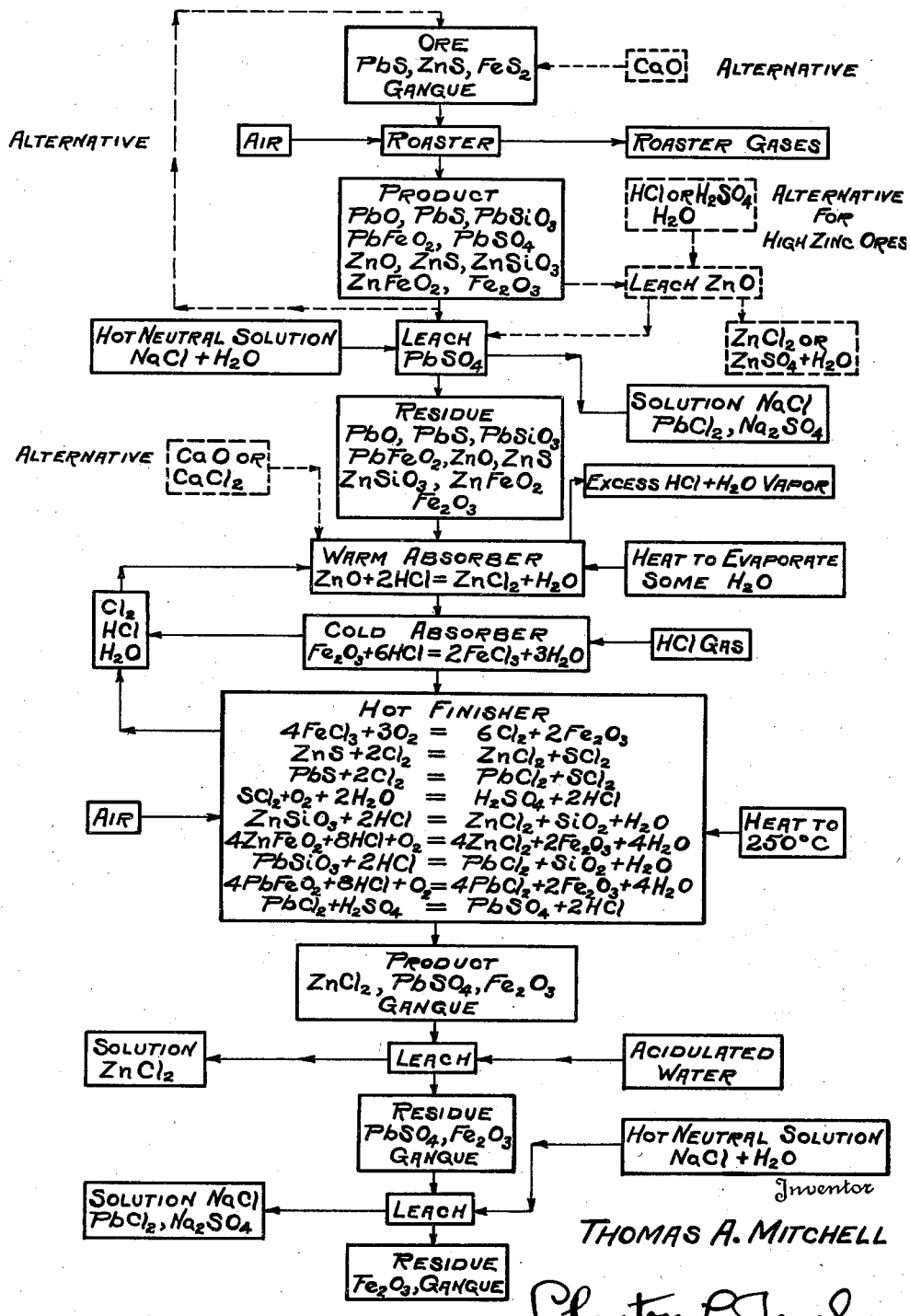

Patented Sept. 15, 1936

2,054,226

UNITED STATES PATENT OFFICE 2,054,226

METHOD OF TREATING LEAD SULPHIDE ORES

Thomas A. Mitchell, Denver, Colo., assignor to Hughes-Mitchell Processes, Incorporated, Denver, Colo., a corporation of Wyoming Application May 16, 1934, Serial No. 725,974

17 Claims. (Cl. 75—113)

This invention relates to methods of recovering values from ores of high lead content, and more particularly to the recovery of lead as well as other metal compounds from ores containing a high content of lead sulphide, together with sulphides of zinc, iron or other metals.

One method of recovering lead from a lead sulphide ore comprises roasting the ore to remove sulphide sulphur and thereafter treating the roasted ore by a series of hydrometallurgical steps which serve to solubilize the lead and other desired metals in the ore. It is, however, found that if one roasts an ore containing a high content of lead sulphide in accordance with the standard practice, there is a tendency for the material to sinter or fuse to such an extent that particles of the lead sulphide are enclosed in a sintered or fused mass and so are not readily acted upon by the oxygen of the air or the various solubilizing agents, such as gases and liquids, used at later stages in the process; hence the recovery of the desired metals is low and inefficient. Moreover, an attempt to chloridize such an ore containing a high content of zinc by means of gaseous reagents which cause the formation of water may result in a lumpy or syrupy ore mass which is not readily penetrated by the gases, owing to the deliquescent nature of the resultant zinc chloride. Also, since zinc sulphide tends to roast to the sulphate as well as the oxide, and since the sulphate radical tends to displace chlorine, the zinc chloride obtained by a standard chloridizing process is likely to be contaminated by its sulphate. If iron is present in the ore, the roasting operation may result in the formation of complex compounds of iron with lead, zinc, etc. which are difficultly treated for recovering the metal values without solubilizing the iron. If a large amount of lead is carried through the whole solubilizing process, this not only requires a larger plant capacity but makes the procedure more complicated. It is highly desirable to remove the lead as soon as possible, except such portion thereof as can be used to a desired end during the later stages. These and various other problems faced in this art have made difficult the hydrometallurgical treatment of a high lead sulphide ore containing zinc, iron, etc., and particularly where the content of both the lead and zinc is high.

It is the primary object of this invention to overcome such problems and to provide an efficient and economical process for treating a lead and zinc sulphide ore of high lead content, which may contain either a high or a low zinc content together with other metals, whereby a satisfactory recovery of not only the lead but also the other desired metals may be had. Further objects will be apparent in the following disclosure.

In accordance with this invention, I propose to so roast a lead and zinc sulphide ore as to form a large amount of lead sulphate from the lead present and then to leach this lead sulphate from the ore before other desired metal values are solubilized by a dry stage chloridizing operation. Moreover, I may so roast the ore that sufficient lead oxide will be formed in situ, or it may be added for the purpose, so that it will take up the available sulphur trioxide during the roasting and/or chloridizing steps and thus reduce the sulphur content of the escaping roaster gases and prevent the formation of zinc or other undesired sulphate to a material extent. As a further feature, I propose to intermix the raw ore with a material containing lead oxide which will serve to minimize the tendency for the ore to sinter, and the roasting operation is so carried on as to form a pulverulent, gas-permeable mass which may be efficiently chloridized for recovering the residual zinc and other values therein. It is preferable to so control the roasting operation that the sulphide sulphur content in the roasted ore is the molecular equivalent of the lead oxide in the roast, or added for the purpose, whereby the lead and not the zinc will take up the available sulphate radical during the chloridizing steps. Other features will be described hereinafter.

Referring to the drawing, I have there illustrated various procedures for treating a sulphide ore containing a high content of lead and a high or a low content of zinc sulphide together with iron sulphide and other materials. This complex ore, after having been crushed or ground to a suitable size or pulverulent condition, and preferably to that size of ore particles which will pass through a screen of 100 meshes to the linear inch, is roasted with air and under oxidizing conditions which result in the formation of a pulverulent, porous or friable product which may be readily permeated by gaseous or liquid reagents. The ore particles should be as little sintered or fused as is feasible under the circumstances. The physical operation of agitating the material thoroughly during roasting aids in keeping the ore particles from agglomerating or sintering together.

As set forth and claimed broadly in my prior application Serial No. 698,551 filed November 17, 1933, which has issued as Patent No. 2,025,068, dated Dec. 24, 1935, lead oxide is capable of taking up available sulphate radical, with the formation of lead sulphate, while at the same time materially protecting zinc oxide from being converted to the sulphate, as well as aiding in keeping the ore in a pulverulent or porous condition which may be readily permeated by gaseous and liquid reagents. I have now found that it is feasible to employ lead oxide in this manner by so roasting the ore containing the lead sulphide as to produce lead oxide as well as a large amount of lead sulphate therein and then mixing some of this roasted product with the raw ore of a second batch. In this intimate and finely divided mixture of the raw ore with the roasted ore, the lead oxide, as well as iron oxide and the inert materials of the gangue which are present, act as a diluent for the ore and tend to prevent fusion or sintering of the ore particles together, and thus allowing the sulphating action to proceed more thoroughly than it otherwise would. The lead oxide thus returned to the process will serve to take up the available sulphate radical which is formed by the decomposition and oxidation of the sulphides of the ore. Thus, a considerable portion of the sulphur trioxide formed during the roasting operation is kept in the roasted material as lead sulphate, and it does not escape with the roaster gases. Moreover, if zinc sulphide is present, the lead oxide tends to take up the sulphate radical which would otherwise combine with the zinc to form zinc sulphate and thus compels the zinc to roast to the oxide form. The temperature of the roasting operation will be that which is found best adapted for producing lead sulphate, and it is preferably held below the decomposition point of lead sulphate, which is approximately 653° C., although some types of ore may be roasted at a higher temperature.

If desired, one may roast the ore with 5% by weight or sufficient alkaline earth metal oxide, hydroxide or carbonate, such as lime, as described in my prior Patent No. 1,943,331, which will insure that the ore does not sinter. If one wishes to take up a considerable amount of the sulphide sulphur of the ore as lead sulphate and not to form the insoluble alkaline earth metal sulphate therewith, then the alkaline earth may be omitted from the roasting step. It is also feasible to employ an alkaline earth to aid the lead in carrying out the functions herein described. It is, however, desirable in either case that a considerable amount of lead sulphate be formed during the roasting operation and that it be leached from the roasted material prior to the chloridization of zinc, etc.

It will, therefore, be appreciated that I so roast a high lead ore with an excess of air and at such a temperature as to form a large amount of lead sulphate which may be readily extracted from the roasted product; but if lead oxide is required for a subsequent roasting operation, then the process is so carried on as to form both lead oxide and lead sulphate. It is desirable, however, to sulphate the greater proportion of the lead in the ore, or at least 60% of the lead, and thus reduce the amount of sulphur-oxygen gases driven off from the roaster. Moreover, in a complex ore containing other sulphides, and particularly iron sulphide, it is now feasible to roast the iron sulphide to ferric oxide and at the same time provide sulphur dioxide which, under the catalytic action of the ferric oxide, tends to form sulphur trioxide and to sulphate the lead oxide. Consequently, it is possible to roast the material at a very low and economical temperature, such as below 653° C., and to get a very high conversion of the lead to lead sulphate. For instance, ores containing 30-40% of lead as sulphide and 40% of pyrite ($FeS_2$) have been so roasted that as high as 70% of the lead has been converted to lead sulphate.

The roasted product, as indicated on the drawing, will contain a mixture of lead, zinc and iron compounds, and of these the lead sulphate content has been brought to a maximum or desired percentage. A further feature of this invention contemplates the removal of that lead sulphate prior to any subsequent solubilizing operation on the other ore values. This is preferably accomplished by the simple step of leaching the roasted ore with a suitable solvent for the lead sulphate. The preferred solvent is a hot neutral solution of sodium chloride in water, which has the capacity of converting the lead sulphate to lead chloride and holding the latter in solution during the leaching operation. The leaching step may be carried out by means of suitable apparatus, such as is shown in my prior Patent No. 1,943,330 of January 16, 1934. The resultant solution of sodium chloride, lead chloride and sodium sulphate in water may then be cooled and the lead chloride crystallized therefrom. This solution may also be treated in various other ways for recovering the lead, such as by precipitating it by means of suitable reagents which throw down the lead as an insoluble salt. For example, the treatment of this hot brine with sodium carbonate will result in the formation of a lead carbonate precipitate, which may be separated from the brine of sodium chloride and sodium sulphate.

This leaching operation has the further important feature, as above stated, of opening up the pores and crevices in the ore particles, because of the removal of a large quantity of the ore values. Hence, the ore particles are now more easily permeated by the gases employed in the subsequent solubilizing step.

In the ore under consideration, there is a quantity of zinc to be recovered, as well as iron which should be left with the insoluble residue. If there is a high content of zinc in the ore, a problem is presented because of the deliquescent nature of zinc chloride. If the zinc oxide is converted to a chloride by treating a substantially dry ore material with hydrochloric acid gas, the resultant water of reaction will tend to dissolve the zinc chloride under low temperature conditions. Also, if water is added or allowed to accumulate in the batch of ore, a zinc chloride solution will result. In such cases, where there is a sufficiently high content of zinc, the deliquescent zinc chloride will go into solution to such an extent that it will form a sirupy or viscous mass and cause the ore material to ball up and form lumps which are not readily permeated by the gases and liquid reagents. This invention, therefore, contemplates removing a considerable or desired proportion of the zinc oxide from a high zinc ore prior to the chloridizing operation and prior to leaching out the lead sulphate, after which the refractory zinc compounds may be effectively chloridized in a substantially dry condition. Zinc oxide is soluble in either hydrochloric or sulphuric acid, and these reagents in an aqueous solution of suitable concentration are preferably employed for leaching the roasted ore. If zinc sulphate has been formed during roasting of either a high or a low zinc ore, it may thus be removed by water or an aqueous solution of sulphuric acid. This leaching operation may be carried on in a suitable apparatus, such as a pachuca, in which the dilute acid is passed repeatedly through a bed of the ore until the desired amount of zinc salt has been removed from the roasted product.

It is ordinarily desirable that the iron remain as an insoluble compound and not be permitted to contaminate the zinc and lead solutions. Consequently, the roasting operation is preferably so carried on as to convert the iron to the ferric oxide condition, in which case the ferric oxide will not be converted to a sulphate or chloride by the subsequent acid treatment until after the zinc has been substantially removed from the ore. Hence, to leave the iron in an insoluble oxide condition, it is desirable to remove only about 80% of the zinc oxide and to leave sufficient in intimate association with the ferric oxide to prevent it from being solubilized by this leaching step. This procedure is satisfactory, since the presence of the small amount of zinc oxide left in the ore material cannot cause the formation of the soupy or viscous condition above described.

After the desired amount of zinc has been removed from the ore, then the residue is leached in a second operation by means of the hot neutral salt solution, as above described, to remove the lead sulphate which is readily recovered in this step. In this way, I may now prepare the ore for a chloridizing operation which is efficient in treating a low zinc ore.

The ore may be chloridized by various suitable procedures which will serve to recover the zinc as a chloride and to leave the lead in a form which may be itself solubilized. Hence, this invention is not to be considered as limited to the method herein described except as is set forth in the claims. One method of chloridizing the ore may be carried on in accordance with the general procedure of my Patent No. 1,943,333 dated January 16, 1934. In this method, the roasted material, in a finely divided and substantially dry condition, may be treated with hydrochloric acid gas first in a warm absorber to chloridize further zinc oxide and then in a cooled absorber to convert the residual zinc oxide to a chloride and to chloridize such portion of the ferric oxide as is needed in the final or finisher stage of the process wherein the ferric chloride is decomposed to form nascent chlorine which then attacks the refractory compounds.

To carry on this process, the roasted and leached ore is separated from its solution and is then dried. The material is then treated while in a granular or pulverulent condition in the first or warm absorber with hydrochloric acid gas, and particularly with the residual gases derived from the finisher and/or second absorber of the chloridizing process, which results in converting residual zinc oxide to zinc chloride. Since this reaction likewise forms water, it is preferred to heat the warm absorber to that temperature at which sufficient water of reaction will be removed from the ore material so that it will remain in a substantially dry and pulverulent condition. It may be desirable to so carry on this process that some zinc oxide will remain when the material goes to the second or cooled absorber wherein the ferric chloride is formed, as above described. Then, when the material is conducted to the second absorber, the remaining zinc oxide will be chloridized and ferric oxide will be converted to ferric chloride by treating the material with strong hydrochloric acid gas, and preferably in the absence of air and under conditions which cause the formation of crystalline hydrated ferric chloride. Since the material was dry when introduced into the second absorber, the temperature may be kept below the boiling point of water, if desired, and yet it will not become soupy or viscous, because the water of reaction will be taken up by the ferric chloride as water of hydration in the crystalline product. Consequently, the material comes from the second absorber in a granular and substantially dry condition. This second absorber may be permitted to attain a higher temperature than the decomposition point of $FeCl_3$ when heated in air, such as 180° C., provided air is not present in such an amount as to cause the decomposition of the ferric chloride to a material extent, or it may be cooled to a point below 100° C. or below that temperature at which ferric chloride decomposes materially in the presence of such air as is admitted to this zone. The residual hydrochloric acid gas may be passed to the warm absorber and there utilized.

The final stage of this dry chloridizing process comprises heating the ore material in a third apparatus known as the finisher while passing it in a counterflow relation to a current of air, which is supplied in amount sufficient to form nascent chlorine by reaction with the ferric chloride. As the material passes through the finisher while being agitated, the first effect upon heating the material is to melt the ferric chloride and cause it to go into solution in its own water of crystallization and thus flow into intimate contact with the ore material and react directly therewith. Furthermore, a certain amount of reaction has already taken place in the second absorber between the ferric chloride and the refractory compounds of the ore, which produces ferrous chloride and an ore metal chloride. Such refractory materials as are not thus chloridized will be attacked by the nascent chlorine formed when the ferric and ferrous chlorides in the finisher have been heated sufficiently to cause reaction with the oxygen. Owing to the counterflow relation of the air and ore, such water vapor as is driven off from the ore material will be removed from the finisher and not be allowed to affect the reaction to a material extent, with the formation of any large amount of hydrochloric acid. These absorber and finisher reactions may be carried on in suitable apparatus, such as long rotary tubes or a chloridizer of the shelf type, in which the ore material is passed by means of revolving rakes from one shelf to another in a vertical series. The lower end of the finisher is preferably heated to 250° C. or higher, which temperature may be widely varied, depending upon the nature of the ore material being treated. Any excess of heat derived from the finisher may be employed in heating the warm absorber, and various procedures may be employed to render the operation efficient and continuous. It will be appreciated that such hydrochloric acid as is formed during the finisher process, as well as the nascent chlorine, will react with the various refractory compounds including the silicates and complex iron compounds to convert the zinc and lead compounds to chlorides. The equations on the drawing indicate the general nature of these reactions, but various other reactions may, of course, take place.

An important feature which characterizes this process resides in the fact that sufficient lead oxide may be left in the leached residue or added thereto prior to the chloridizing operation and at any suitable stage, so that there will be enough lead present to combine with all of the available sulphate radical formed during the chloridizing step and fix the same as lead sulphate, and thus prevent the formation of zinc sulphate and the like. It is to be understood that the composition of the ore material being treated may be modified at any suitable stage of the process to effect the desired results. In particular, it is feasible to add lead oxide or sulphide to the raw ore or to mix various ores for the purpose, or otherwise to modify the proportion of lead in the total ore material so as to supply sufficient lead oxide for the process, as well as to form the desired lead sulphate. In this way, any suitable raw ore may be modified by adding lead, zinc or iron compounds to give those proportions which will best carry out the steps of the process, as determined by analysis of the product at the various stages of its treatment. It is to be understood that the lead oxide serves to fix the available sulphur trioxide or the available sulphate radical during both the roasting and chloridizing stages and that the amount used should be sufficient for all of its functions. As an example of the requirements during chloridization, the amount of lead oxide which may be left in the leached residue or which may be added prior to this chloridizing stage may be readily determined by analyses of the ore material and finisher product and by observation of the process. If, for example, the sulphur in the material going to the finisher comprises 2½% of the total weight and if the original ore contained 40% of lead, then 60% of the lead may be extracted as a sulphate during the leaching operation and the rest should be an oxide which will combine with the available sulphate radical formed by the residual sulphur in the ore. It is to be understood that some of the SO₃ gas escapes and that only that portion is available which contacts reactively with the lead and zinc oxides in the ore material; hence the relative proportions will be determined best by trial. Any lead chloride which may be formed will act in the same way to fix the sulphate radical. In this way, I insure that the sulphur found in the residual zinc and lead sulphides, which is first released as sulphur chloride and then converted to sulphur trioxide or sulphuric acid, will not combine ultimately with the zinc to form zinc sulphate, but will be fixed as lead sulphate, and thus leave the chlorine combined with the zinc.

It is also to be understood that, if desired, I may introduce lime or calcium chloride or the oxides or chlorides of the other alkaline earth metals, barium and strontium, for fixing the available sulphate radical formed or present during the absorber and finisher operations. In such a case, the alkaline earth material may either supplement the lead oxide and lead chloride present or serve wholly in its place for the purpose of fixing the available sulphate radical. The alkaline earth sulphates are insoluble in water and thus will go with the residue. Similarly, lead sulphate is insoluble in water and may thus be readily separated from the soluble zinc chloride.

In accordance with this procedure, all of the lead and zinc have now been converted to soluble compounds and may be readily separated and recovered. This is easily accomplished by leaching the finisher product, containing zinc chloride, lead sulphate, ferric oxide and the gangue, by means of water or an acidulated water containing either hydrochloric acid or sulphuric acid, which forms a solution of a zinc salt. In the preferred form, the excess hydrochloric acid and water vapor from the absorbers may be utilized to form a solution for leaching the zinc chloride from the residue. The leached material may be suitably washed with water or acidulated water to remove the last traces of zinc chloride. Thereafter, the residue is leached with a hot aqueous solution of sodium chloride to dissolve such lead chloride as is present and to convert the lead sulphate in the ore residue to lead chloride in solution. The lead may be suitably recovered from this solution, as by cooling the solution and precipitating the lead chloride or by means of sodium carbonate to precipitate it as lead carbonate. This operation thus serves to remove the lead from the ore and leave only the ferric oxide as gangue, together with such other ore metal values as are not recovered by the process above described.

Many advantages will be apparent in this process, and particularly in view of the fact that it now makes it possible to recover both the lead and the zinc from a complex ore containing a high content of lead with a high or a low content of zinc. By returning the partially roasted lead ore for use in a subsequent roasting operation, the roasted material is kept in a porous and pulverulent condition, and the available sulphate radical is taken up by the lead, which would otherwise combine to form zinc sulphate. In this way, the zinc may be compelled to go wholly to the oxide condition, although the ore is roasted either autogenously or under low temperature conditions which, in the standard roasting process, would produce zinc sulphate to a considerable extent. Moreover, the available sulphur trioxide is taken up in the roasting operation by the lead as a sulphate and the escaping roaster gases are low in their sulphur content. If the roasting step is so carried on as to form zinc sulphate, this may be removed by leaching prior to the first absorber treatment. Also, by removing a large portion of the lead from the ore during the first leaching operation, it will now be possible to pass the ore more rapidly through the chloridizing process or to utilize a smaller chloridizing apparatus for treating a given volume of ore, since the chloridizing operation is directed only to the recovery of the residual lead and zinc compounds.

It will be appreciated that I may mix with the raw ore a previously roasted ore of the same nature as the raw ore employed, or another ore of suitable composition which contains enough lead oxide to fix the available sulphur trioxide. Also, I employ sufficient ore gangue containing ferric oxide, lead oxide, etc. in a finely divided condition, i. e. crushed or ground to that fineness of grain size which will insure exposure of substantially all of the ore values to the reagent fluids, to insure that the product comes from the roaster in a proper condition for treatment by the reagent gases and liquids employed at the various stages of the process. The ferric oxide is useful in the process in its ability to serve catalytically in converting sulphur dioxide to the trioxide, and thus providing sulphate radical for the lead. In this way, the sulphur content of the escaping roaster gases is materially reduced.

It is also feasible to so control the roasting operation by methods within the knowledge of those skilled in the art, as determined by analysis of the roasted material, that the amount of residual zinc, lead and iron sulphides, or the total available sulphide sulphur which remains in the roast, shall be present in amount sufficient to sulphate all the lead oxide left in the roast, or provided for the purpose, and yet I may avoid having an excess of sulphur dioxide and trioxide gases in the finisher which would go to the first absorber with the waste gases and there form zinc sulphite and sulphate. Any deficiency of lead oxide, or any excess of sulphide sulphur in the finisher is not desired, and their proportions may be controlled by any of the methods above described, so that the available SO₃ gas, which does not go up the chimney, may be taken up by the PbO present and substantially all of this oxide may be sulphated. Various other modifications will be apparent to one skilled in the art, and the numerous features set forth in my prior Patents Nos. 1,943,331 to 1,943,341 inclusive relating to the Mitchell process may be incorporated in this procedure.

Having thus described the invention, what is claimed as new and desired to secure by Letters Patent is:

1. The method of treating a complex lead and zinc sulphide ore which has a high lead content comprising the steps of roasting the ore with air to convert the major portion of the lead sulphide to lead sulphate, dissolving lead sulphate from the roasted ore, thereafter drying the ore material and treating it in a substantially dry condition with a chloridizing agent and thereby forming in situ the chloride of zinc and subsequently leaching said chloride from the ore residue.

2. The method of chloridizing a complex ore containing zinc and a high lead content comprising the steps of roasting the ore in a finely divided condition with air and in the presence of an agent capable of fixing the available sulphate radical and causing the zinc to roast to the oxide and maintaining a low temperature sufficient to burn the sulphides and form lead sulphate, leaching lead sulphate from the roasted product and thereafter chloridizing a zinc compound within the ore material.

3. The method of chloridizing a sulphide ore containing zinc and a high content of lead comprising the steps of roasting the ore in a finely divided condition with air and at a low temperature to form lead sulphate, leaching the ore with a solvent for the lead sulphate to remove the same, drying the residue, treating it in a substantially dry condition with chloridizing gases and converting zinc compounds to a chloride, and thereafter leaching the zinc chloride from the residue.

4. The method of treating a sulphide ore containing high contents of both zinc and lead according to claim 3 in which a large percentage of a soluble zinc compound is leached from the roasted ore prior to the chloridization of the refractory zinc compounds by gases containing or producing water and thereby preventing the deliquescent zinc chloride from hindering materially the chloridization step, after which the ore is chloridized by said gases.

5. The method of claim 3 in which the raw ore is roasted in intermixture with a roasted ore containing sufficient lead oxide and diluents to prevent the zinc sulphide from roasting to a sulphate during a low temperature operation and to insure that the product is a non-sintered, pulverulent, fluid permeable material.

6. The method of treating a complex sulphide ore containing zinc and a high lead content comprising the steps of roasting the ore with air to form lead oxide and lead sulphate therein, leaching lead sulphate from the roasted ore, chloridizing a zinc compound therein by treating the material with a chlorine bearing reagent in the presence of sufficient lead oxide to fix the available sulphate radical and prevent the formation of zinc sulphate, thereafter leaching the zinc chloride from the ore and obtaining a solution which is substantially free from its sulphate, and recovering the residual lead sulphate.

7. The method of treating a complex lead and zinc sulphide ore comprising the steps of mixing finely divided ore with sufficient lead oxide to take up a large part of the available sulphate radical as lead sulphate, roasting the mixture with air at a low temperature to produce a non-sintered mass and to form lead sulphate by oxidation of the lead sulphide and by the combination of the lead oxide with available sulphur trioxide, leaching lead sulphate from the roasted product by means of a solvent therefor, and thereafter treating the ore material with a chloridizing agent to solubilize the zinc content and recovering it as an aqueous solution of zinc chloride.

8. The method of treating a complex sulphide ore containing lead and zinc in accordance with the method of claim 7 characterized by the fact that after the lead sulphate has been leached from the ore material, the wet ore mass is treated in a substantially dry condition with chloridizing gases comprising hydrochloric acid and chlorine to convert the residual zinc oxide, zinc sulphide and other refractory zinc compounds to zinc chloride, and the zinc chloride is then leached from the ore material as an aqueous solution.

9. The method of treating a complex lead and zinc sulphide ore according to claim 7 in which the intermixture of ore and lead oxide is formed by adding to the raw ore a previously roasted lead sulphide ore containing a considerable amount of lead oxide and inert gangue.

10. The method of treating a complex lead and zinc sulphide ore containing a high content of lead comprising the steps of intimately mixing therewith and in finely divided condition a previously roasted ore containing sufficient lead oxide and the gangue to prevent sintering during the roasting operation and to fix the available sulphur trioxide as lead sulphate, roasting the mixture with air and at a low temperature, while agitating the same, so as to form lead sulphate from the lead sulphide and oxide present and produce a non-sintered, fluid permeable granular material, leaching the lead sulphate from the roasted material by means of a solvent therefor, and thereafter treating the residue with an acid reagent capable of forming a water soluble salt of zinc and leaching it therefrom.

11. The method of treating a lead and zinc sulphide ore according to claim 10 in which the lead oxide is present in sufficient amount during the roasting operation to cause the zinc sulphide to roast largely to the oxide at a low temperature, after which the zinc oxide is solubilized by an acid reagent and leached from the ore residue and the lead sulphate is then leached from the ore.

12. The method of claim 10 in which a complex ore containing zinc, iron and lead sulphides is roasted with air to form ferric oxide and some lead oxide, after which this roasted material is mixed in finely divided condition with a further batch of raw ore and in which the ferric and lead oxides are present in amount sufficient to cause a large portion of the sulphide sulphur to remain in the roasted product as lead sulphate.

13. The method of treating a complex zinc and lead sulphide ore containing a high lead content comprising the steps of roasting the ore with air and at a low temperature to convert the major portion of the lead sulphide to a sulphate, but providing sufficient lead oxide to fix the available sulphur trioxide during the roasting operation, oxidizing a large portion of the sulphide sulphur to sulphur trioxide and causing it to remain in the roasted product as lead sulphate, leaching the lead sulphate from the roasted product and thereafter drying and treating the material in a substantially dry condition with a chloridizing reagent to solubilize the zinc content and dissolving the zinc chloride from the ore residue.

14. The method of treating a complex sulphide ore containing zinc and lead sulphides according to claim 13 and in which the chloridizing treatment comprises subjecting the ore in a substantially dry condition to the action of hydrochloric acid gas and chlorine gas to convert zinc oxide, zinc sulphide and other refractory zinc compounds to zinc chloride, whereby the chloridizing treatment is carried on in the absence of any large amount of lead oxide and without the wasting of material amounts of chloridizing reagents and forming lead chloride thereof.

15. The method of treating a lead and zinc sulphide ore according to claim 13 in which a previously roasted ore material containing lead oxide is intermixed with the raw ore prior to the roasting operation and which contains sufficient lead oxide, taking into account the amount formed during roasting, that substantially all of the available sulphate radical will be fixed as lead sulphate during the roasting step.

16. The method of treating a complex ore containing the sulphides of lead and zinc comprising the steps of roasting the ore with air under low temperature conditions which serve to form lead sulphate and lead oxide and thereafter chloridizing a refractory zinc compound under oxidizing conditions which will convert the sulphide sulphur to sulphur trioxide, and characterized by the fact that residual sulphide sulphur is left in the roasted ore to provide sulphur trioxide in an amount which is sufficient only to convert the lead oxide present during chloridization to a sulphate.

17. The method of treating a complex lead and zinc sulphide ore according to claim 16 in which the roasted ore containing the residual sulphide is chloridized by heating the product intermixed with iron chloride and in the presence of air sufficient to form ferric oxide and nascent chlorine in amount sufficient to convert the residual ore metal sulphide to a chloride and to form sulphur trioxide in amount sufficient to react with the lead oxide present in the ore material.

THOMAS A. MITCHELL.